Aug. 3, 1954
R. A. FINDLAY
2,685,555
OIL EXTRACTION FROM SHALE
Filed Dec. 20, 1950
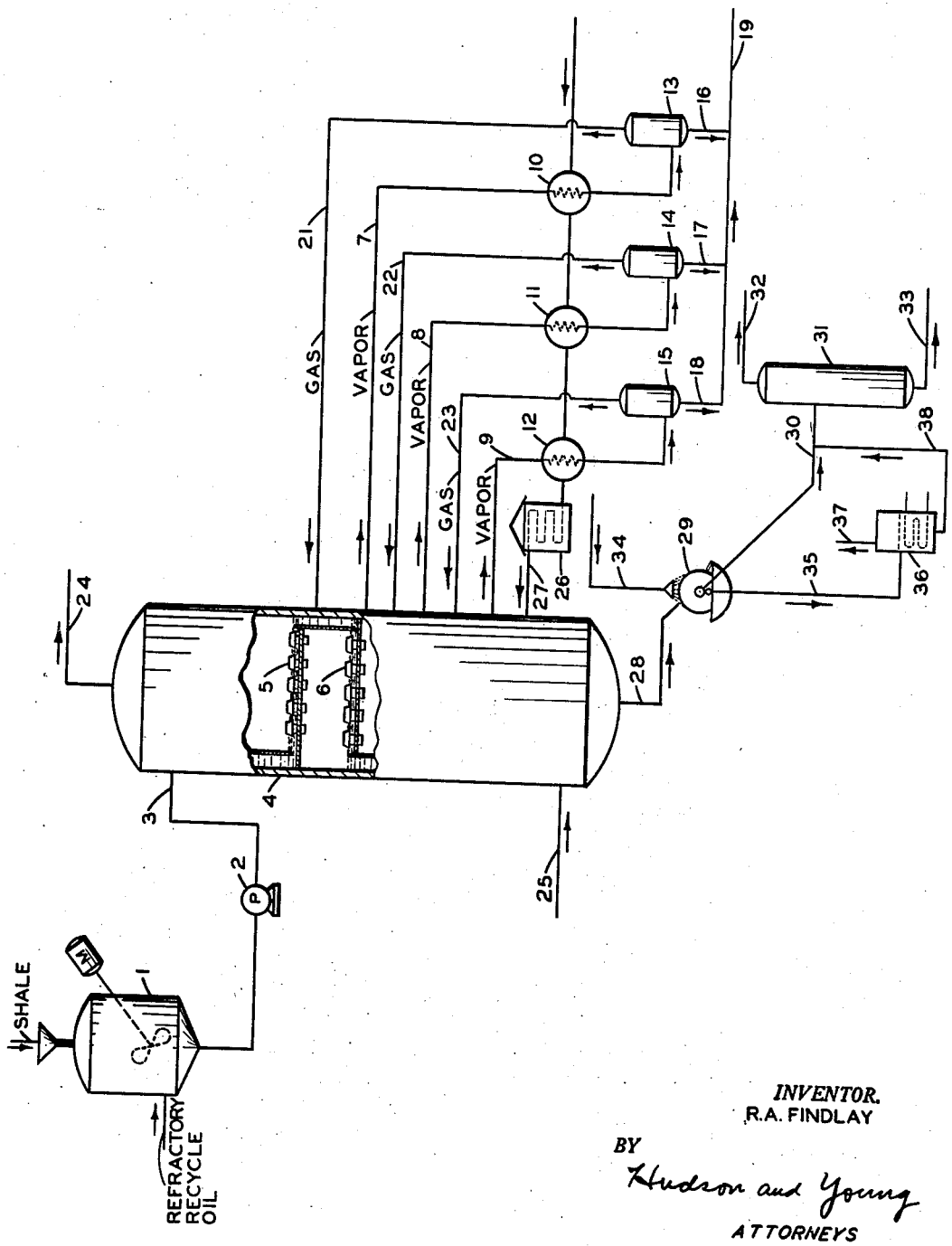
INVENTOR.
R.A. FINDLAY
BY
Hudson and Young
ATTORNEYS Patented Aug. 3, 1954

2,685,555

UNITED STATES PATENT OFFICE 2,685,555

OIL EXTRACTION FROM SHALE

Robert A. Findlay, Bartlesville, Okla., assignor to Phillips Petroleum Company, a corporation of Delaware Application December 20, 1950, Serial No. 201,789

5 Claims. (Cl. 196—14)

This invention relates to the recovery of shale oil products. In one of its aspects the invention relates to the treatment of crushed shale according to a method and in a manner such that oil products are recovered to a maximum extent without incurring any appreciable undesired reactions, e. g. polymerization, destructive pyrolysis, etc.

According to the invention the shale is crushed and made up in slurry form, employing for this purpose a refractory recycle or other oil, and then passed downwardly through a plate and cap or bubble tray equipped column countercurrently with hot vapors which can be a vaporized portion of the refractory oil employed to make up the aforesaid slurry. As the slurry passes downwardly through the column, from tray to tray, the temperature of the shale therein is gradually increased resulting in vaporization of recoverable oils. Vapors are taken off at points spaced along the column, cooled and condensed. Non-condensed gases or vapors are returned to the tower. Finally the slurry, substantially denuded of its recoverable oils, reaches the locus of introduction of the hot refractory oil. At this stage of its travel down through the tower, the slurry can be heated to a moderate or even a severe cracking temperature for a suitable length of time, if desired, thus recovering additional products, among which may be found the refractory oil to be employed in the method. Progressing down through the bottom portion of the column, the slurry can be subjected to a gas stripping step. Gas for this purpose can be the gas taken overhead from the column before and after treatment in a gas adsorption plant. Spent shale, which is withdrawn from the tower or column, can be filtered and used as fuel, for example, to supply heat to the refractory oil. This use of the spent shale, at its location of treatment is a point of advantage of my method, the principal advantage of which is, as stated, the recovery of shale oil products to a maximum extent without incurring any appreciable undesired reactions. It is apparent that in the method of the invention, the oils are recovered immediately upon their vaporization. The method according to the invention combines in its operational steps the effect of a gradual heating with a solvent extraction effect produced by the recycle of refractory oil. Thus the method according to the invention comprises, in effect, a heat-extraction step. The refractory oil is preferably a highly aromatic recycle stock which can result from normal refinery operations.

The drawing illustrates a specific embodiment of the invention. Referring now to the drawing a refractory oil, which can be oil recovered and recycled from the oil extraction column, is used to make up a shale slurry in slurry tank 1. The characteristics of the recycle oil are to be such that it will not decompose to any undesired products during the shale extraction step of the method and that it will be substantially recoverable from the spent shale before the shale is used as fuel or disposed of in any other manner. Refractory recycle oil will ordinarily contain fractions boiling in the range of from 500° to 900° F. The slurry is pumped from tank 1 by means of slurry pump 2 through line 3 to oil extraction tower 4. The slurry is fed to the top of the tower and is allowed to cascade or flow downwardly therethrough over a plurality of bubble cap trays like 5 and 6 as shown in the drawing. Obviously, tower 4 will contain a large number of trays like trays 5 and 6 but for sake of simplicity only two trays have been shown. Tower 4 is provided with a plurality of vapor drawoff lines 7, 8 and 9 leading to coolers and condensers indicated by 10, 11 and 12 in the drawing. Substantially liquefied streams are withdrawn from 10, 11 and 12 and subjected to gas separation in gas separators 13, 14 and 15 from which liquid product is withdrawn through lines 16, 17, 18 and 19. Non-condensed portions of the vapors entering gas separators 13, 14, and 15 are returned through lines 21, 22 and 23 to the tower 4. Any gas which remains uncondensed in tower 4 is finally withdrawn through line 24 and is treated in a gas absorption plant following which the treated gas is returned through line 25 and introduced into the bottom of tower 4 to act as a stripping and cooling medium for stripping of the spent shale before the said shale is discarded, as above described. The use of the process gas as a stripping gas serves to dilute the decomposition products in the upper portions of the column, thus minimizing undesired polymerization and tar formation. Refractory oil, which as stated, can be recovered from the process, is passed into heat exchange relationship with the vapors passing through lines 7, 8 and 9 to gas separators 13, 14 and 15 and then is preheated to a temperature in the range of 800° to 1000° F. in heater 26 and introduced through line 27, to tower 4, thus supplying the heat required in the method for the recovery of the oil from the shale.

The column is operated under a pressure in the range of from atmospheric to 300 pounds per square inch and the operation is conducted to maintain a temperature in the hottest portion of the heating section in the range of 700°–900° F. depending upon retention time and type of shale chosen. The stripped spent shale is withdrawn from tower 4, through line 28, and then passed through a filter 29 and line 30 to fractionator 31 wherein oil separated from the shale is separated into a recycle or gas oil and a heavy oil which are recovered from the fractionator 31 through lines 32 and 33 respectively.

The filtered spent shale is washed while on the filter 29 with a relatively low boiling hydrocarbon introduced through line 34. The low-boiling hydrocarbon containing oil extracted from the shale filter cake flows via line 35 to flash drum 36 where the low-boiling hydrocarbon is flashed off as a vapor via line 37. The remaining oil flows via line 38 to line 30. The wet filter cake is removed from filter 29 and conveyed to a zone, not shown, where the low-boiling hydrocarbon is recovered by vaporization.

In place of bubble cap equipped trays in column 4, suitably sized, shaped and spaced pieces of shale can be used in the column.

In addition to the advantages already set out herein, it is to be noted especially that operation according to this invention will realize considerable economy of heat as well as cooling water. Thus, one skilled in the art will realize from this disclosure that there is involved considerable economy of heat as well as cooling water due to the manner in which the countercurrent heat extraction step can be brought about. However, as stated, it is part of the concept of this invention that the products as formed are rapidly removed thus avoiding undesirable or secondary reactions.

Reasonable variation and modification are possible within the scope of the foregoing disclosure and the appended claims to the invention the essence of which is that a method wherein a slurry of oil shale is gradually heated by countercurrent contact with hot vapors of a refractory oil to gradually release from the shale recoverable oil vapors and wherein the said oil vapors are recovered immediately as formed has been provided as herein set forth and described.

I claim:

1. A method for recovering shale oil from shale which comprises the steps of forming a slurry of shale with a refractory oil; passing said slurry downwardly in a fractionation vessel, provided with means for effecting intimate contact between slurry and vapors, into counter-current heat-extraction relationship with hot vapors of a refractory oil, thus forming vaporous oil products from the shale; and immediately recovering and removing said vaporous oil products, as formed, from said fractionation vessel at a plurality of points to avoid further contact with said hot vapors and condensing said vaporous oil products.

2. A method for the recovery of products from oil shale which comprises passing of a slurry of crushed shale downwardly into counter-current heat-extraction relationship with hot vapors of a refractory oil in a fractionating column provided with means for effecting intimate contact between slurry and vapors, the said shale being introduced to a top portion of said tower and ultimately withdrawn from the bottom thereof; the said refractory oil vapors being introduced into a lower portion of said tower and ultimately, after yielding up heat and being condensed, withdrawn from the bottom thereof, withdrawing at a plurality of points along said tower immediately as formed vaporous products generated as a result of the said counter-current heat-extraction relationship between the said slurry and said oil vapors; and withdrawing said slurry and oil from the bottom of said tower.

3. A method for the recovery of products from oil shale which comprises the steps of preparing a slurry of crushed shale with a refractory oil and passing said slurry to the top of and downwardly through a fractionating column; introducing to a lower portion of said column vapors of a refractory oil heated to a temperature of 800 to 1,000 degrees Fahrenheit, thereby causing counter-current heat-extraction of said slurry with the vapors of said heated refractory oil; removing at a plurality of points along said column immediately as formed vaporous products generated during said counter-current heat-extraction; condensing said vaporous products; and removing slurry and refractory oil which has given up heat from the bottom of said tower.

4. A method according to claim 3 wherein the slurry removed from the bottom of said tower is filtered; and the oil thus recovered is reheated and re-used as the hot refractory oil.

5. A method according to claim 3 wherein the refractory oil is highly aromatic in character.

References Cited in the file of this patent

UNITED STATES PATENTS

| Number | Name | Date |
|---|---|---|
| 1,458,983 | Kirby | June 19, 1923 |
| 2,167,250 | Pfirrmann | July 25, 1939 |
| 2,406,810 | Day | Sept. 3, 1946 |
| 2,431,677 | Brown | Dec. 2, 1947 |